Sept. 27, 1927.  
C. D. GILL  
1,643,885  
MEANS FOR LOADING AND HAULING AUTOMOBILES  
Filed Dec. 24, 1926  
2 Sheets-Sheet 2
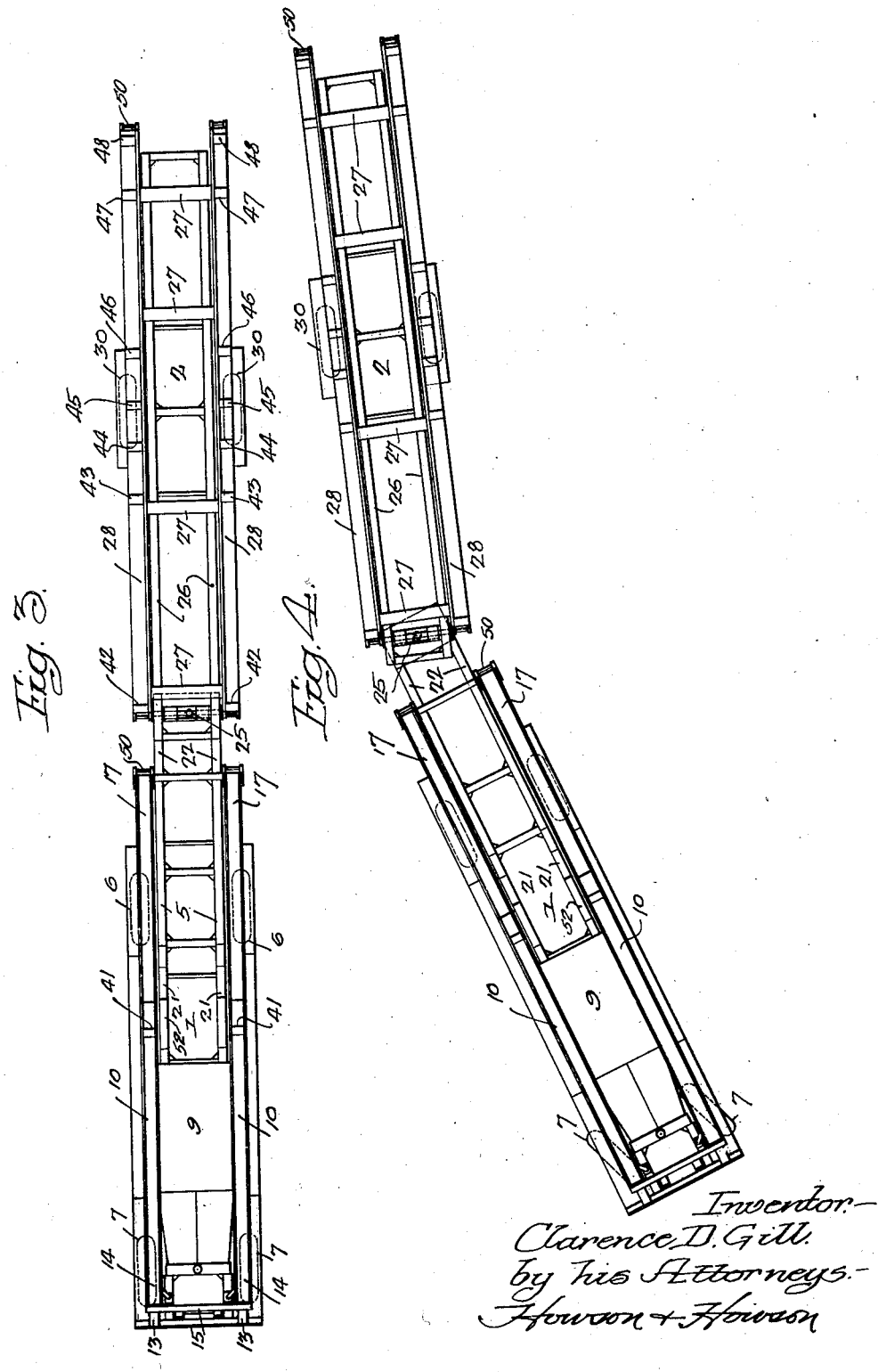

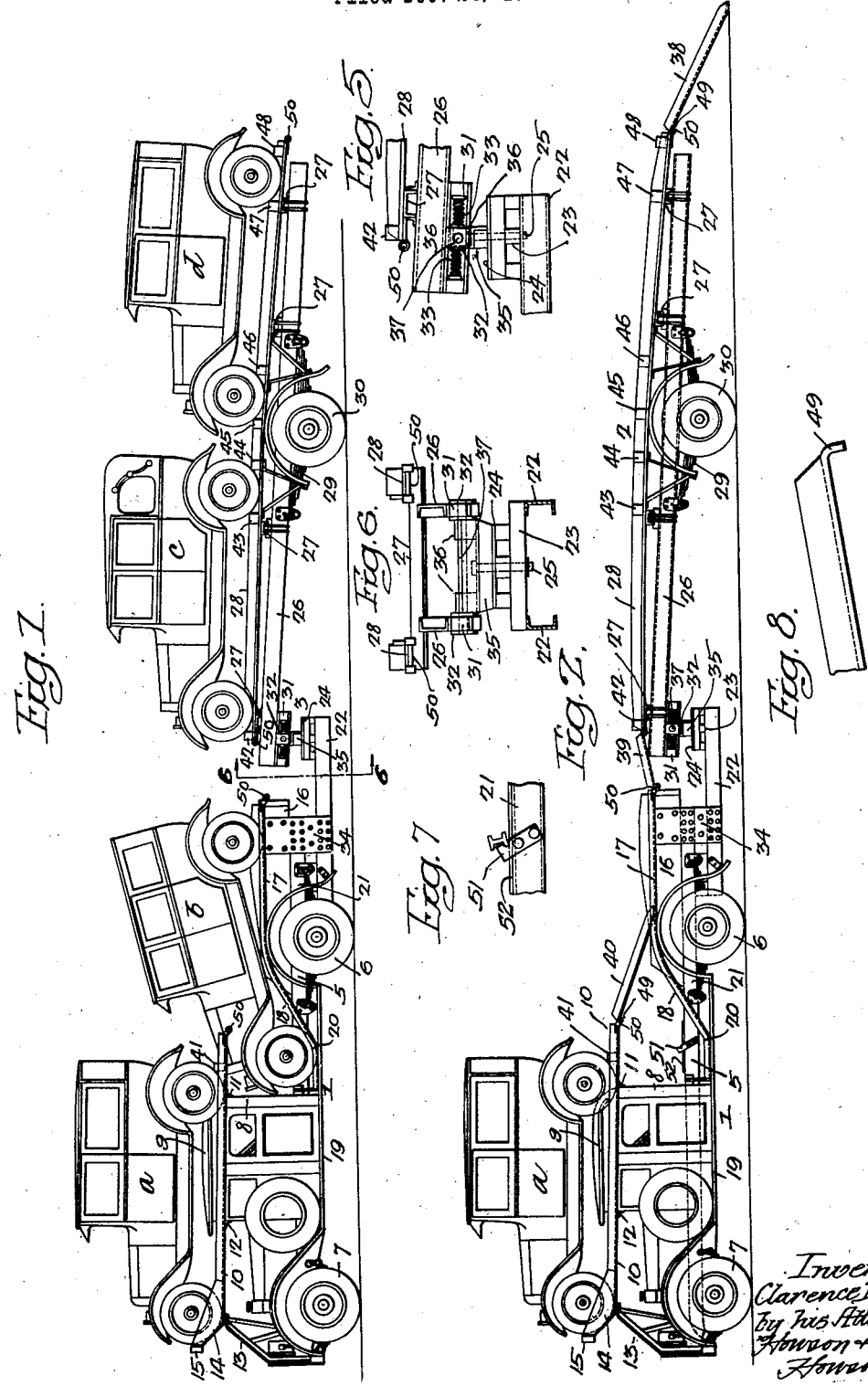

Patented Sept. 27, 1927.

1,643,885

UNITED STATES PATENT OFFICE.

CLARENCE D. GILL, OF TRENTON, NEW JERSEY.

MEANS FOR LOADING AND HAULING AUTOMOBILES.

Application filed December 24, 1926. Serial No. 156,948.

My invention relates to apparatus designed especially for transporting new automobiles from factory or freight depot to sales agencies, remote from the factory or freight depot.

The usual practice of delivery is to assign a driver to each automobile and run the car under its own power or in tow from the depot to the agency, thus requiring numerous employees and necessitating the washing and cleaning of the new cars when they arrive at the agency, after road travel.

By the use of my forwarding apparatus, which comprises a truck and trailer of special construction, a single driver can load, transport and deliver four cars on each trip from the depot and the cars do not require washing after they are received.

Fig. 1 illustrates my forwarding apparatus, in side elevation, fully loaded and ready for moving;

Fig. 2 illustrates the apparatus partially loaded;

Fig. 3 is a plan view of the apparatus without being loaded;

Fig. 4 is a view similar to Fig. 3, illustrating the apparatus as making a turn;

Fig. 5 is an enlarged side elevation of the connection between truck and trailer;

Fig. 6 is a transverse elevation partly in section of the connection illustrated in Fig. 5, taken on the line 6—6, Fig. 1, and Figs. 7 and 8 are details of the invention.

My improved forwarding apparatus comprises a truck 1 and a trailer 2 universally connected at 3, comprising an articulated conveyance capable of holding four automobiles $a$, $b$, $c$ and $d$.

The truck 1 comprises the usual chassis having a frame 5, rear drive wheels 6, 6, and front steering wheels 7, 7, spring suspended in the usual manner. On the frame 5 I provide a driver's cab 8 of any substantial construction, adjacent each side and the top 9 of which I mount a rail, comprising a channel beam 10, in the present instance.

The channel beams 10, 10 are secured to the cab 8 through the medium of angle beams 11 and 12, and to the forward end of the frame 5 by means of structural iron brace members 13, 13. The forward end of each rail beam 10 is provided with a boot 14, transversely connected by a bar 15.

Adjacent the rear of the frame 5, the truck chassis is provided with a super-structure comprising longitudinal plates 16, 16 suitably secured to the frame 5, to each of which is secured a rail beam 17 in line with the rails 10, 10 and extending forward over the rear wheels 6, thence dropping on a fair incline 18 to a point below the top of the frame 5, on the top of the foot board 19 of the chassis, whereby a pocket 20 is formed in each of the rails 17.

Under the rear end of and aligned with the side beams 21 of the chassis frame 5 I provide rearwardly extending beams 22, 22 which are connected by transverse bars 23, 23 on which, and centrally disposed relative to the chassis, is a platform 24, for the support of a king pin 25. The beams 16, 21 and 22 are tied together by plates 34, 34 one at each side of the chassis.

The trailer 2 comprises longitudinal stringers 26, 26 suitably connected by transverse beams 27, 27 which also function to support rail beams 28, 28. The stringers 26, 26 are suitably connected by springs 29 to an axle on which is rotatably mounted the trailer wheels 30, 30.

On the under side of each of the stringers 26, 26 I provide a guideway 31, for a crosshead 32 and mount intermediate each end of the cross-head and the adjacent end of the guideway a buffer spring 33.

Rotatably mounted on the king bolt 25 is a cross beam 35 having bearings 36, 36 secured to each of its ends. The bearings 36, 36 occupy positions intermediate the crossheads 32, 32, and a horizontal pivot bolt 37 passes through the said cross-heads and said bearings. Thus it will be seen that a relative vertical pivotal movement and a relative horizontal pivotal movement is permitted between the truck 1 and the trailer 2, through the pivot bolt 37 and the king bolt 25 of the connection 3.

For the purpose of loading, the truck and trailer are maneuvered into contiguous alignment (see Figs. 2 and 3) and skids 38, 39 and 40 are placed respectively from the ground to the rear ends of the trailer rails 28, 28; from the front ends of said trailer rails 28 to the rear ends of the truck rails 17, 17; and from the rear ends of the truck rails 10, 10 to a point on the rails 17, 17 rearward of the incline 18 thereof.

An automobile $a$ is run over the skids 38, rails 28, skids 39, rails 17 and skids 40 onto the rails 10, and forward thereon until the front wheels of the car rest in the boots 14. A block 41 is secured behind the rear wheels of the car, the car put "in gear" and the emergency brake "set."

The skids 40 are now removed for the purpose of loading car $b$ which travels the same route until it reaches the incline 18 of the rails 17 whereupon its nose dips until its front wheels rest in the pockets 20 of the rails 17. Car $b$ is then put "in gear" and its brake "set".

The skids 39 are then removed and car $c$ run onto the trailer rails 26 until the front wheels rest against a block 42 and the back wheels rest between blocks 43 and 44, the car is put "in gear" and the brake "set".

Car $d$ is then loaded with its front wheels resting between blocks 45 and 46 and its rear wheels resting between blocks 47 and 48; the car is put "in gear", the brake "set", the skids 38 removed, and the forwarding apparatus is ready to move.

The blocks 41, 42, 43, 44, 45, 46, 47 and 48 are preferably secured permanently in place, but may be removable if desired. Each of the skids is provided with a lip 49 (Fig. 8) adapted to hook over a rod 50 on the ends of the rails, whereby the skids are conveniently removable from the rails.

On the beams 21 of the chassis frame 5, I provide hook members 51 (Figs. 2 and 7) which are adapted to engage the front axle of car $b$ and prevent its being run against the back of the driver's cab 8, when loading. The axle of the car rests on wear plates 52 secured to the chassis members 21, 21 and relieves the rails 20, 20 from the support of the entire weight of the car $b$.

It will be noted that the connection 3 is disposed intermediate the truck rear wheels 6 and the trailer wheels 30 for the purpose of permitting the forwarding apparatus to turn sharp corners (see Fig. 4).

Obviously more or less than four cars could be carried without departing from the spirit of the invention.

I claim:

1. An automobile forwarding apparatus comprising an elongated conveyance having contiguously aligned rails thereon and being articulated intermediate its respective ends, the portion at one side of said articulation comprising a power driven unit and the portion at the other side of said articulation being a trailer unit.

2. An automobile forwarding apparatus comprising an elongated conveyance having contiguously aligned rails thereon and being articulated intermediate its respective ends, the portion at one side of said articulation comprising a power driven unit and the portion at the other side of said articulation being a trailer unit; and means for securing a plurality of automobiles on said rails for transportation.

3. An apparatus for loading and transporting a plurality of automobiles by a single operator; comprising a power truck; carrying rails mounted on said truck; a trailer operatively connected to said truck; and carrying rails on said trailer adapted to be aligned with the carrying rails on said truck, for loading said automobiles.

4. An apparatus for loading and transporting a plurality of automobiles by a single operator; comprising a power truck; carrying rails mounted on said truck; a trailer operatively connected to said truck; carrying rails on said trailer adapted to be aligned with the carrying rails on said truck, for loading said automobiles; and means for preventing movement of the automobiles on the rails during transportation.

5. An apparatus for loading and transporting a plurality of automobiles by a single operator; comprising a power truck; carrying rails mounted on said truck; a trailer operatively connected to said truck; carrying rails on said trailer adapted to be aligned with the carrying rails on said truck, for loading said automobiles; pockets formed in the rails of said truck; and stops on said rails, for preventing relative movement between the cars and the rails during transportation.

6. An apparatus for loading and transporting a plurality of automobiles by a single operator; comprising a power truck; carrying rails mounted on said truck; a trailer operatively connected to said truck; carrying rails on said trailer adapted to be aligned with the carrying rails on said truck; and skids adapted to be placed intermediate said rails and intermediate said rails and the ground, for loading said cars.

7. An apparatus for loading and transporting a plurality of automobiles by a single operator; comprising a power truck; carrying rails mounted on said truck; a trailer; carrying rails on said trailer adapted to be aligned with the carrying rails on said truck; front and rear wheels on said truck; wheels on said trailer; and a pivotal coupling between said truck and said trailer intermediate the rear wheels of the truck and the wheels of the trailer.

8. An apparatus for loading and transporting a plurality of automobiles by a single operator; comprising a power truck; carrying rails mounted on said truck; a trailer; carrying rails on said trailer adapted to be aligned with the carrying rails on said truck; front and rear wheels on said truck; wheels on said trailer; and a pivotal coupling between said truck and said trailer intermediate the rear wheels of the truck and the wheels of the trailer, including buffer mechanism permitting a limited relative longitudinal movement between said truck and said trailer.

9. An apparatus for loading and transporting a plurality of automobiles by a single operator; comprising a power truck; a driver's cab on said truck; means on said truck adapted to carry a car above said driver's cab; and means on said truck for carrying a car to the rear of said driver's cab.

10. An apparatus for loading and transporting a plurality of automobiles by a single operator; comprising a power truck; a driver's cab on said truck; means on said truck adapted to carry a car above said driver's cab; means on said truck for carrying a car to the rear of said driver's cab; and means for arresting the cars in their forward movement on said truck.

11. An apparatus for loading and transporting a plurality of automobiles by a single operator; comprising a power truck; a driver's cab on said truck; carrying rails at each side of said cab adjacent the top thereof; carrying rails on said truck to the rear of said cab extending above the truck rear wheels and having a downwardly extending incline intermediate said rear wheels and the back of said cab, forming pockets in said rear carrying rails.

12. An apparatus for loading and transporting a plurality of automobiles by a single operator; comprising a power truck; a driver's cab on said truck; carrying rails at each side of said cab adjacent the top thereof; and boots formed on the forward ends of said rails.

CLARENCE D. GILL.